United States Patent
Morgan (10) Patent No.: US 8,075,255 B2
(45) Date of Patent: Dec. 13, 2011

(54) REDUCING INTER-SEAL GAP IN GAS TURBINE

(75) Inventor: Victor John Morgan, Simpsonville, SC (US)

(73) Assignee: General Electric Company, Schenectady, NY (US)

(*) Notice: Subject to any disclaimer, the term of this patent is extended or adjusted under 35 U.S.C. 154(b) by 379 days.

(21) Appl. No.: 12/415,081

(22) Filed: Mar. 31, 2009

(65) Prior Publication Data

US 2010/0247300 A1    Sep. 30, 2010

(51) Int. Cl.
*F01D 5/00* (2006.01)

(52) U.S. Cl. .................. 415/173.1; 415/173.3; 416/191; 277/614

(58) Field of Classification Search ........... 415/173.1, 415/173.3; 277/608, 614, 615, 644; 416/181, 416/191, 192
See application file for complete search history.

(56) References Cited

U.S. PATENT DOCUMENTS

| | | | |
|---|---|---|---|
| 5,657,998 A | 8/1997 | Dine et al. | |
| 5,823,741 A | 10/1998 | Predmore et al. | |
| 5,868,398 A | 2/1999 | Maier et al. | |
| 5,915,697 A | 6/1999 | Bagepalli et al. | |
| 6,199,871 B1* | 3/2001 | Lampes | 277/614 |
| 6,402,466 B1 | 6/2002 | Burdgick et al. | |
| 6,652,229 B2 | 11/2003 | Lu | |
| 6,733,234 B2* | 5/2004 | Paprotna et al. | 415/138 |
| 6,883,807 B2* | 4/2005 | Smed | 277/644 |
| 6,926,284 B2* | 8/2005 | Hirst | 277/603 |
| 7,445,425 B2* | 11/2008 | Ferra et al. | 415/134 |
| 7,513,740 B1* | 4/2009 | Hervy et al. | 415/173.1 |

* cited by examiner

*Primary Examiner* — Caridad Everhart
(74) *Attorney, Agent, or Firm* — Hoffman Warnick LLC (57) ABSTRACT

A device for reducing inter-seal gap in gas turbines. Embodiments of a gas turbine with a first arcuate component adjacent to a second arcuate component; a first slot and a connected second slot on an end of the first arcuate component; a first seal disposed into the first slot and a first adjacent slot on the second arcuate component; a second seal disposed into the second slot and a second adjacent slot on the second arcuate component, leaving a gap between the first seal and the second seal; and a connector coupled to the first seal and the second seal and substantially covering the gap between the first seal and the second seal.

20 Claims, 10 Drawing Sheets

REDUCING INTER-SEAL GAP IN GAS TURBINE

FIELD OF THE INVENTION

This invention relates generally to gas turbines and more particularly to a device for reducing inter-seal gap in gas turbines.

BACKGROUND OF THE INVENTION

The main gas-flow path in a gas turbine commonly includes the operational components of a compressor inlet, a compressor, a turbine and a gas outflow. There are also secondary flows that are used to cool the various heated components of the turbine. Mixing of these flows and gas leakage in general, from or into the gas-flow path, is detrimental to turbine performance.

The operational components of a gas turbine are contained in a casing. The turbine is commonly surrounded annularly by adjacent arcuate components. As used herein, the term "arcuate" may refer to a member, component, part, etc. having a curved or partially curved shape. The adjacent arcuate components include outer shrouds, inner shrouds, nozzle blocks, and diaphragms. Arcuate components may provide a container for the gas-flow path in addition to the casing alone. Arcuate components may secure other components of the turbine and may define spaces within the turbine. Between each adjacent pair of arcuate components is a space that permits the arcuate components to expand as the operation of the gas turbine forces the arcuate components to expand.

Slots are defined on the sides of each arcuate component for receiving a seal in cooperation with an adjacent slot of an adjacent arcuate component. The seal is placed in the slot to prevent leakage between the areas of the turbine on either side of the seal. These areas may include the main gas-flow path and secondary cooling flows.

The slots within the end of a particular arcuate component may be angled in orientation to each other and the slots may connect. When a planar seal is received in each of the two slots that are connected, a gap is left between the two seals. This gap permits leakage between the internal and external areas of the gas turbine. Reducing this gap improves gas turbine performance.

BRIEF DESCRIPTION OF THE INVENTION

A first aspect of the disclosure provides a gas turbine, comprising: a first arcuate component adjacent to a second arcuate component; a first slot and a connected second slot on an end of the first arcuate component; a first seal disposed into the first slot and a first adjacent slot on the second arcuate component; a second seal disposed into the second slot and a second adjacent slot on the second arcuate component, leaving a gap between the first seal and the second seal; and a connector coupled to the first seal and the second seal and substantially covering the gap between the first seal and the second seal.

A second aspect of the disclosure provides a gas turbine, comprising: a turbine including at least one annular arrangement of arcuate components; a first arcuate component adjacent to a second arcuate component, wherein the first arcuate component and second arcuate component are one of an outer shroud, an inner shroud, a nozzle block or a diaphragm; a first slot and a connected second slot on an end of the first arcuate component; a first seal disposed into the first slot and a first adjacent slot on the second arcuate component; a second seal disposed into the second slot and a second adjacent slot on the second arcuate component, leaving a gap between the first seal and the second seal; and a connector coupled to the first seal and the second seal and substantially covering the gap between the first seal and the second seal.

These and other aspects, advantages and salient features of the invention will become apparent from the following detailed description, which, when taken in conjunction with the annexed drawings, where like parts are designated by like reference characters throughout the drawings, disclose embodiments of the invention.

BRIEF DESCRIPTION OF THE DRAWINGS

The above and other aspects, features and advantages of the invention will be better understood by reading the following more particular description of the invention in conjunction with the accompanying drawings.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

Figure 1:
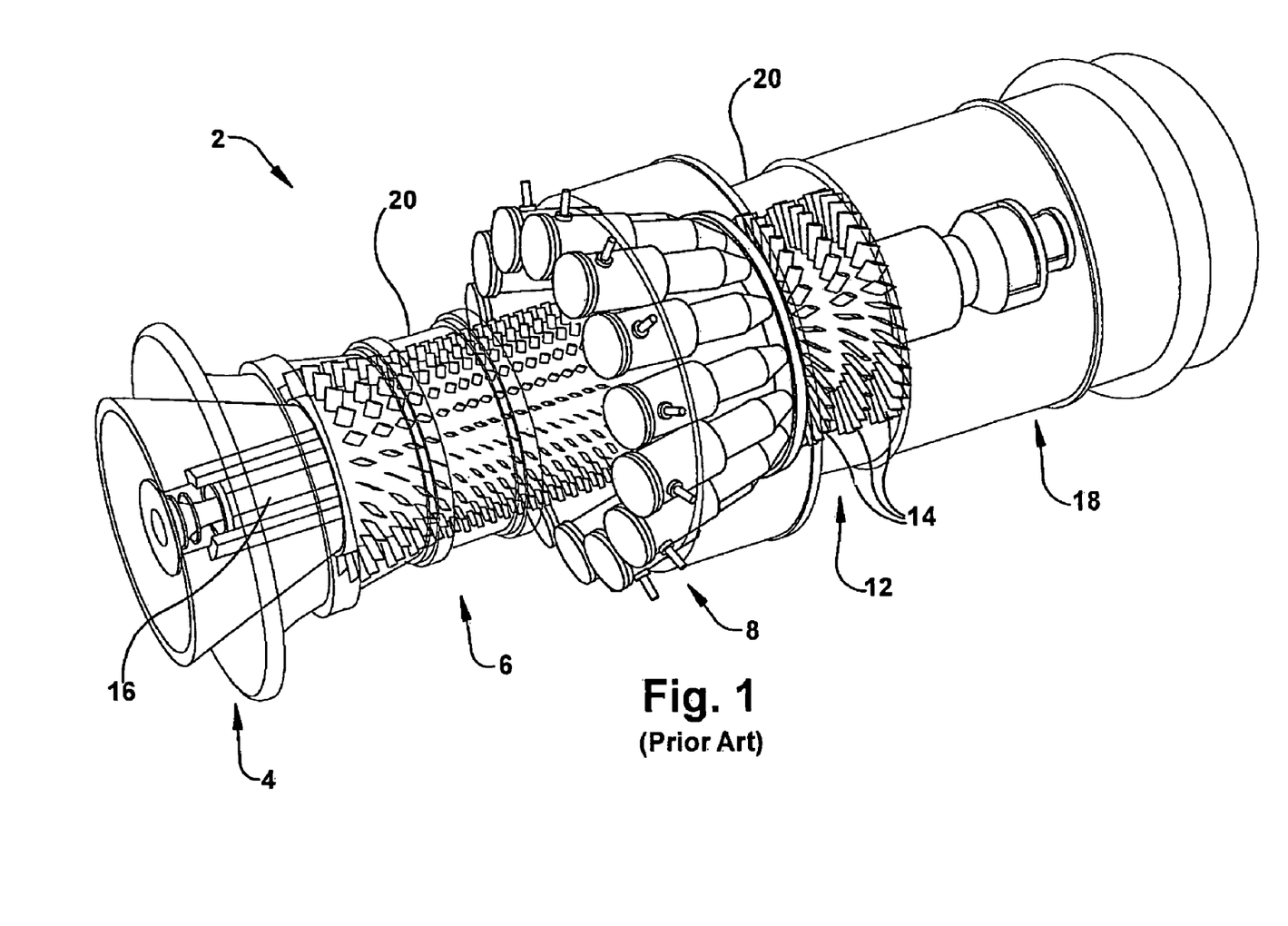
FIG. 1 shows a perspective partial cut-away view of a known gas turbine.

"Referring to FIG. 1, a perspective view of one embodiment of a gas turbine 2 is shown. In this embodiment, gas turbine 2 includes a compressor inlet 4, a compressor 6, a plurality of combustors 8, a compressor discharge (not shown), a turbine 12 including a plurality of turbine blades 14, a rotor 16 and a gas outflow 18. Compressor inlet 4 supplies air to compressor 6. Compressor 6 supplies compressed air to combustors 8 where it mixes with fuel. Combustion gases from combustors 8 propels turbine blades 12. Propelled turbine blades 12 rotate rotor 16. A casing 20 forms an outer enclosure that encloses compressor inlet 4, compressor 6, plurality of combustors 8, compressor discharge (not shown), turbine 12, turbine blades 14, rotor 16 and gas outflow 18. Gas turbine 2 is only illustrative; teachings of the invention may be applied to a variety of gas turbines."

Figure 2:
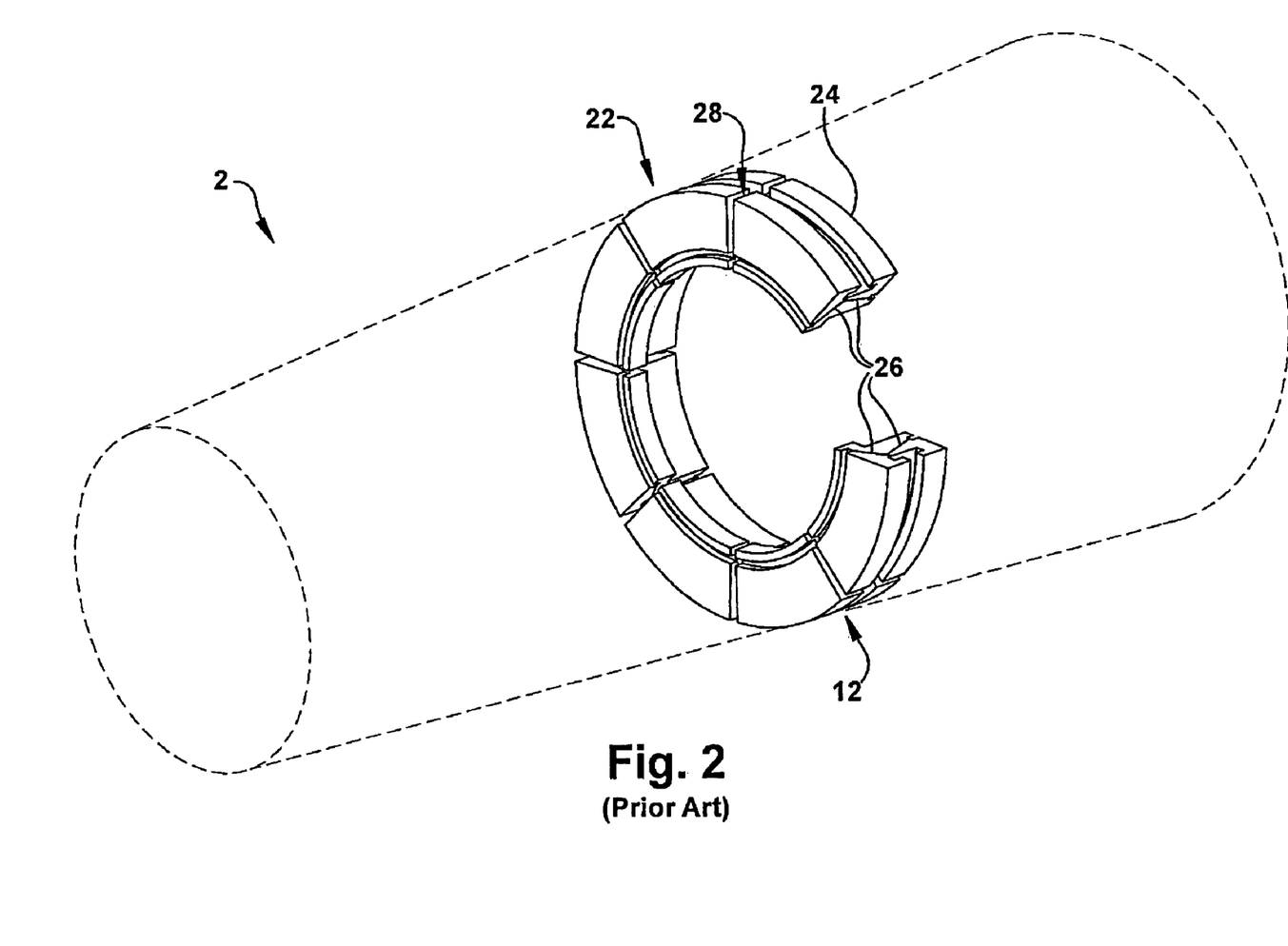
FIG. 2 shows a perspective view of known arcuate components in an annular arrangement.

"Referring to FIG. 2, a perspective view of one embodiment of an annular arrangement 22 of arcuate components 24 of turbine 12 of gas turbine 2 is shown. This view shows seven arcuate components 24 with one arcuate component removed for illustrative purposes. The end of each arcuate component 24 has slots 26. Between each arcuate component 24 is a space 28. A person skilled in the art will readily recognize that annular arrangement 22 may have any number of arcuate components 24; that arcuate components 24 may be of varying shapes and sizes; and that arcuate components 24 may serve different functions in gas turbine 2. For example, arcuate components in a turbine may include, but not be limited to, outer shrouds, inner shrouds, nozzle blocks, and diaphragms as discussed below."

Figure 3:
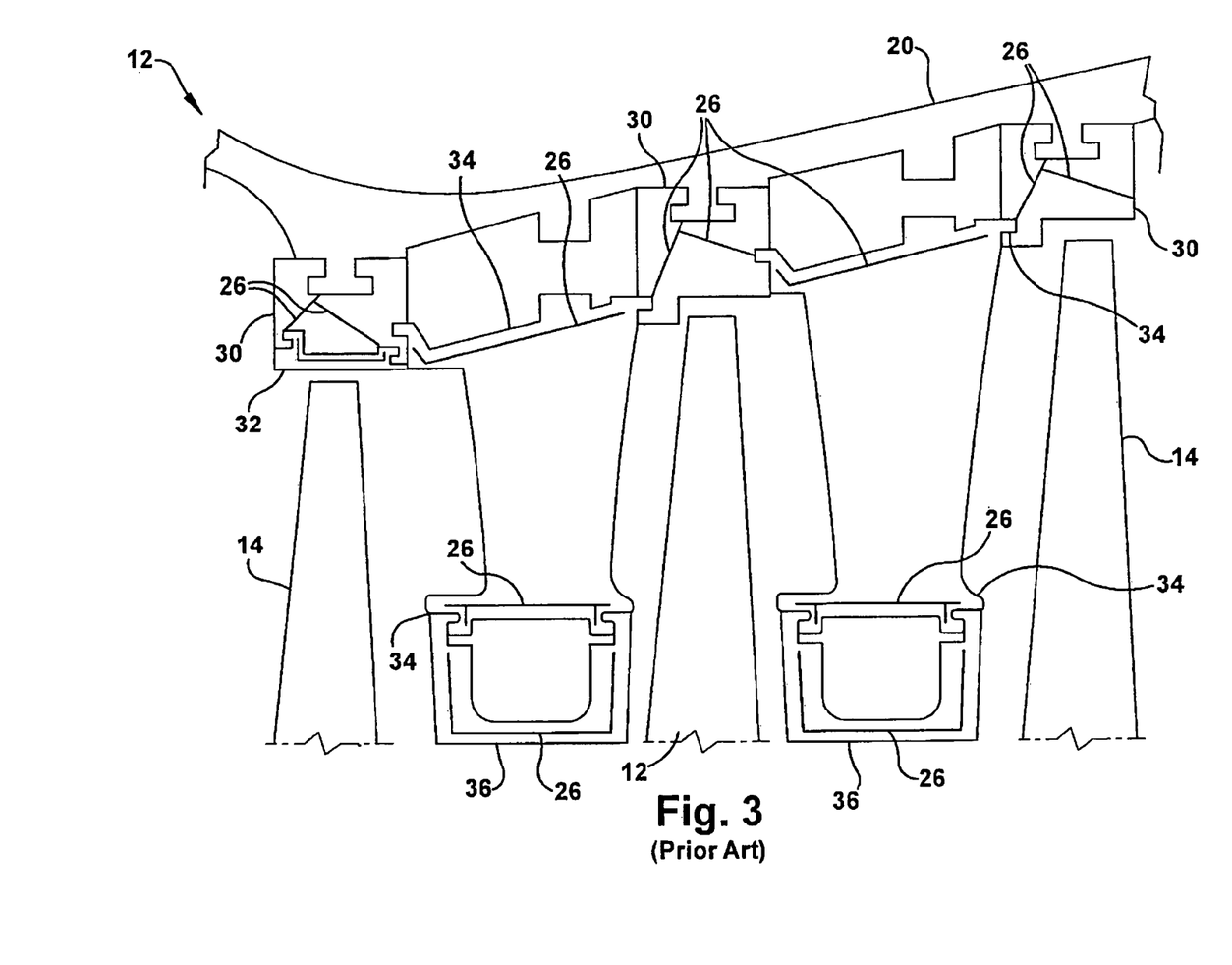
FIG. 3 shows a cross-sectional longitudinal view of a known turbine of a gas turbine.

"Referring to FIG. 3, a cross-sectional view of one embodiment of turbine 12 of gas turbine 2 (FIG. 1) is shown. In this embodiment, casing 20 encloses a plurality of outer shrouds 30, an inner shroud 32, a plurality of nozzle blocks 34, a plurality of diaphragms 36, and turbine blades 14. Each of the outer shrouds 30, inner shroud 32, nozzle blocks 34 and diaphragms 36 are arcuate components 24. Each of the outer shrouds 30, inner shrouds 32, nozzle blocks 34 and diaphragms 36 have slots 26 in a side thereof. In this embodiment, outer shrouds 30 connect to casing 20; inner shroud 32 connects to outer shrouds 30; nozzle blocks 34 connect to outer shrouds 30; and diaphragms 36 connect to nozzle blocks 34. A person skilled in the art will readily recognize that many different arrangements and geometries of arcuate components are possible. Alternative embodiments, may include different arcuate components, more arcuate components, or less arcuate components."

Figure 4:
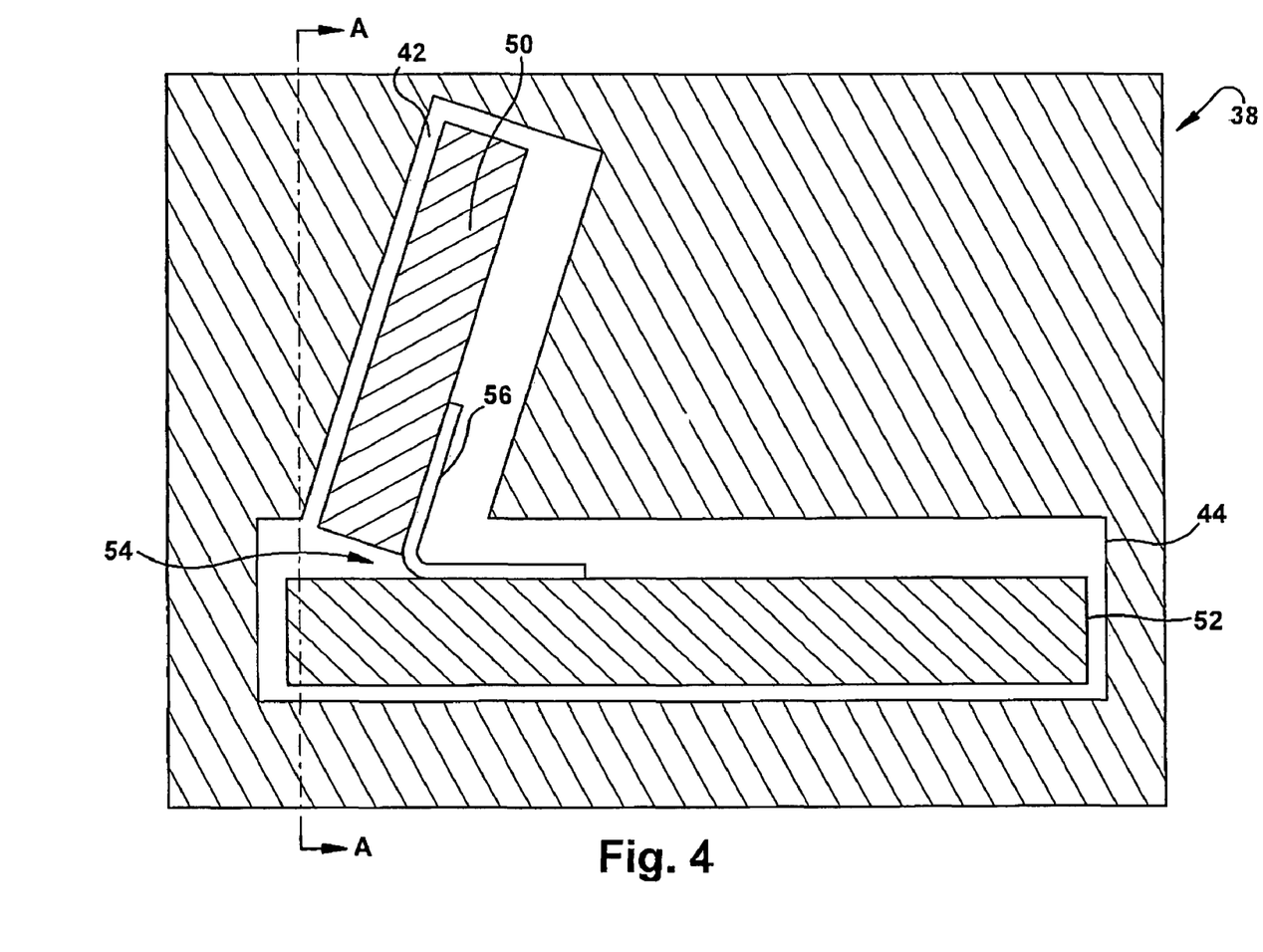
FIG. 4 shows a cross-sectional end view of one embodiment of an arcuate component with seals disposed in connected slots and a connector received in the slots in accordance with this invention.
Figure 5:
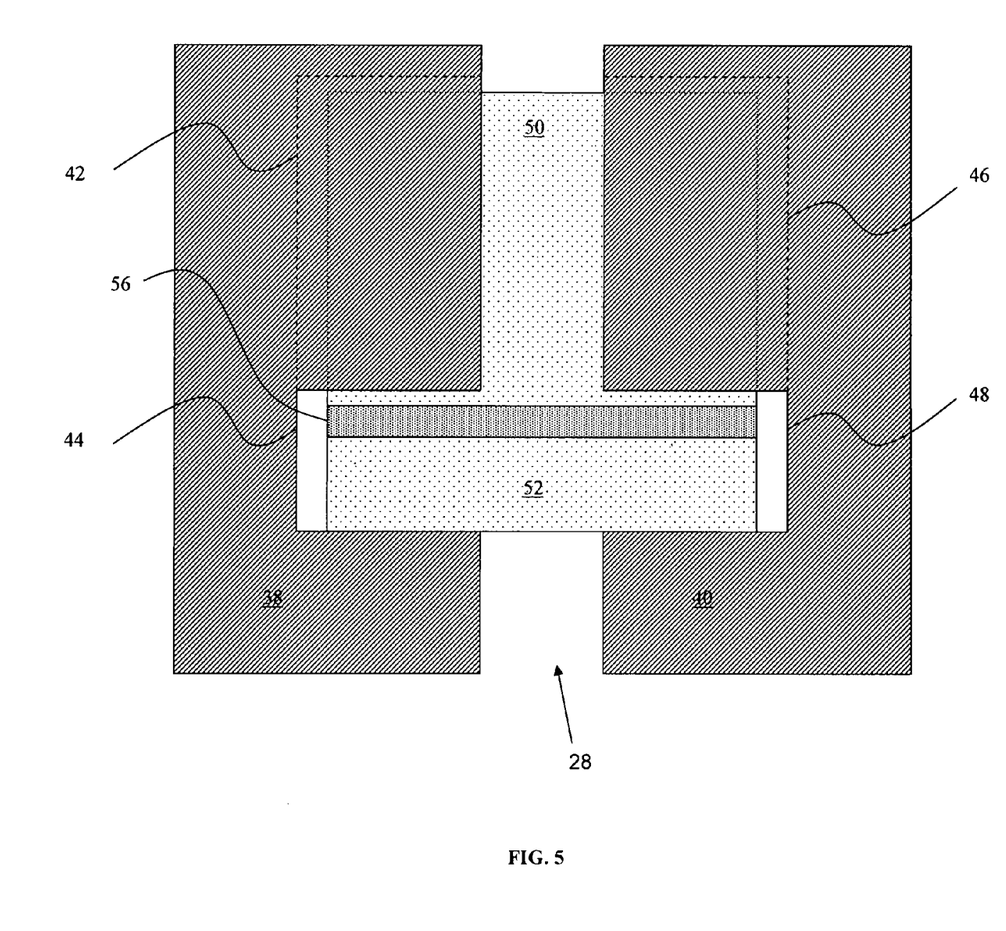
FIG. 5 shows a cross sectional axial view along line A-A in FIG. 4 of one embodiment of two adjacent arcuate components with seals and a connector received in the slots in accordance with this invention.

FIG. 4 shows an end view of a first arcuate component 38 with a first slot 42 and a second slot 44 on an end of first arcuate component 38. First slot 42 and second slot 44 are shown at an angle in relation to each other and connect to one another. FIG. 5 shows a cross sectional axial view along line A-A in FIG. 4 of first arcuate component 38 adjacent to second arcuate component 40. The space 28 is left between first arcuate component and second arcuate component. A first adjacent slot 46 and a second adjacent slot 48 on second arcuate component 40 are shown. First adjacent slot 46 is connected to second adjacent slot 48.

FIG. 4 and FIG. 5 also show a first seal 50 disposed into first slot 42 and a second seal 52 disposed into second slot 44. The disposition of first seal 50 and second seal 52 leaves a gap 54 (FIG. 4) between first seal 50 and second seal 52. FIG. 5 shows first seal 50 disposed into first slot 42 and first adjacent slot 46 on second arcuate component 40; and second seal 52 disposed into second slot 44 and second adjacent slot 48 on second arcuate component 40.

FIG. 4 and FIG. 5 also show one embodiment in accordance with this invention of a connector 56 coupled to first seal 50 and second seal 52 and substantially covering gap 54 between first seal 50 and second seal 52.

Figure 6:
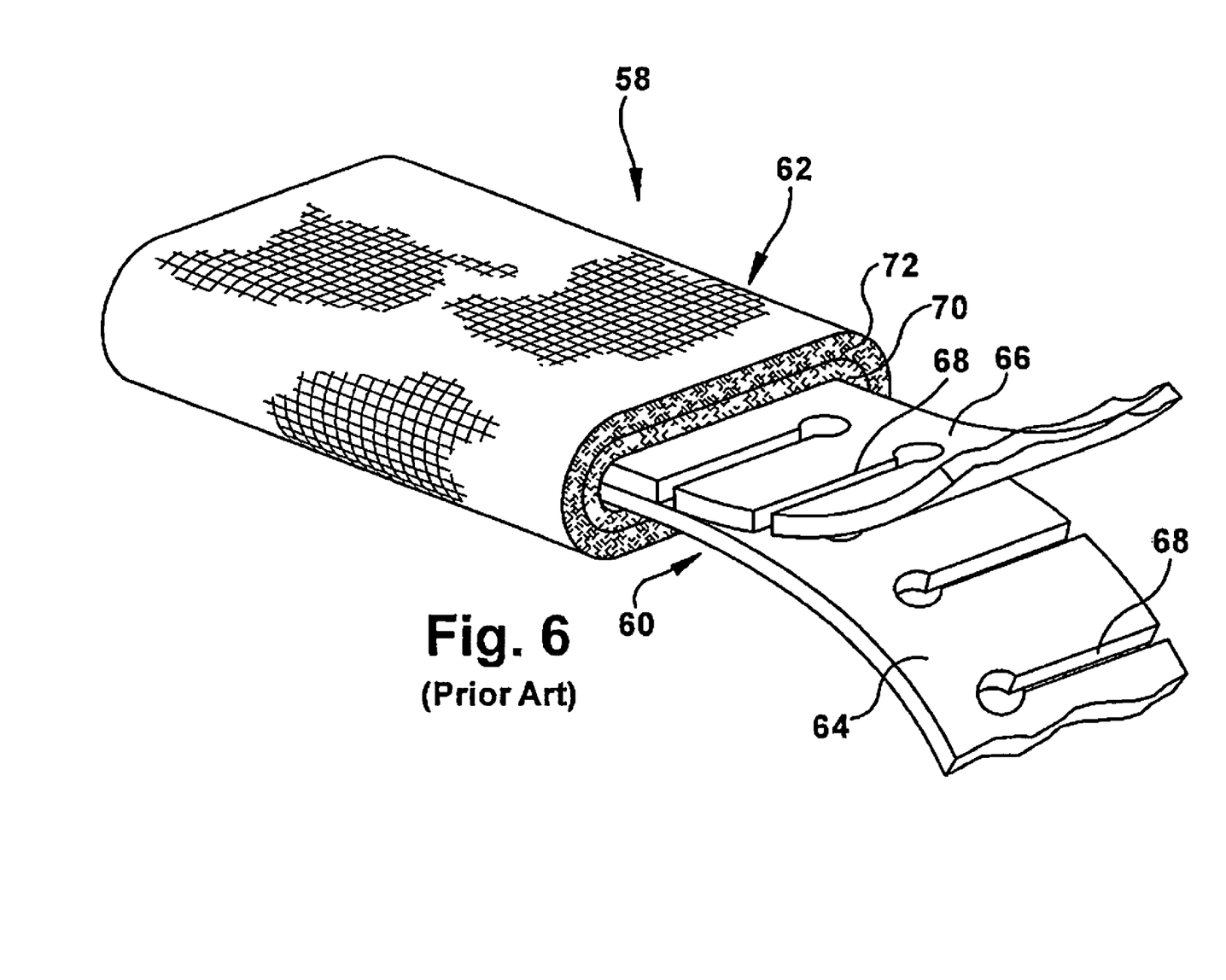
FIG. 6 shows a perspective partial cut-away view of a known seal 58.

"In one embodiment of the invention, connector 56 is substantially the same width as first seal 50 and second seal 52. In one embodiment, connector 56, first seal 50 and second seal 52 include at least one of metal, a cloth-layer, a cloth-layer assemblage, and/or a foil-layer assemblage. For example metal, may include stainless steel and/or Inconel® from Huntington Alloys Corporation. Further, a cloth-layer, a cloth-layer assemblage, foil and/or a foil-layer assemblage as described in Dinc et al. (U.S. Pat. No. 5,657,998) may be used. FIG. 6 shows a perspective partial cut-away view of a known seal 58. Known seal 58 could represent first seal 50, second seal 52 and/or connector 56. Known seal 58 includes a foil-layer assemblage 60 and a cloth-layer assemblage 62.

The foil-layer assemblage 60 is an assemblage of overlying layers of foil. The foil comprises (and preferably consists essentially of) metal, ceramic, and/or polymer foil. The choice of materials for the foil and the choice of the thickness for a layer are made to meet the sealing and flexibility requirements of a particular seal or connector application. In one embodiment, as shown in FIG. 6, the foil-layer assemblage 60 may have a first foil layer 64 and a second foil layer 66. In another embodiment, for added flexibility, the first and second foil layers 64 and 66 each have slots 68. The cloth layer assemblage 62 is an assemblage of overlying layers of cloth. A cloth layer comprises (and preferably consists essentially of) metal, ceramic, and/or polymer fibers which have been woven, knitted or pressed into a layer of fabric. The choice of layer construction (i.e. woven, knitted or pressed), the choice of materials for the cloth, and the choice of the thickness for a layer are made to meet the wear resistance, flexibility, and sealing requirements of a particular seal or connector application. In one embodiment, as shown in FIG. 6, the cloth-layer assemblage 62 may have a first cloth layer 70 and a second cloth layer 72. A person skilled in the art will readily recognize that connector 56, first seal 50 and second seal 52 may be composed of many materials. In one embodiment, connector 56 may include a flexible material, for example, more slots 68 (FIG. 6) are included. In another embodiment, first seal 50 and second seal 52 may include a semi-rigid material, for example, fewer slots 68 (FIG. 6) are included. Connector 56 may be more flexible than first seal 50 and second seal 52. Connector 56, first seal 50 and second seal 52 may be substantially planar. In one embodiment of the invention, connector 56, first seal 50 and second seal 52 are substantially rectangular; however, this is not necessary in all cases. In one embodiment, connector 56, first seal 50 and second seal 52 are substantially elongate; for example, the thickness of the connector 56, first seal 50 and/or second seal 52 is thin relative to length.

Figure 7:
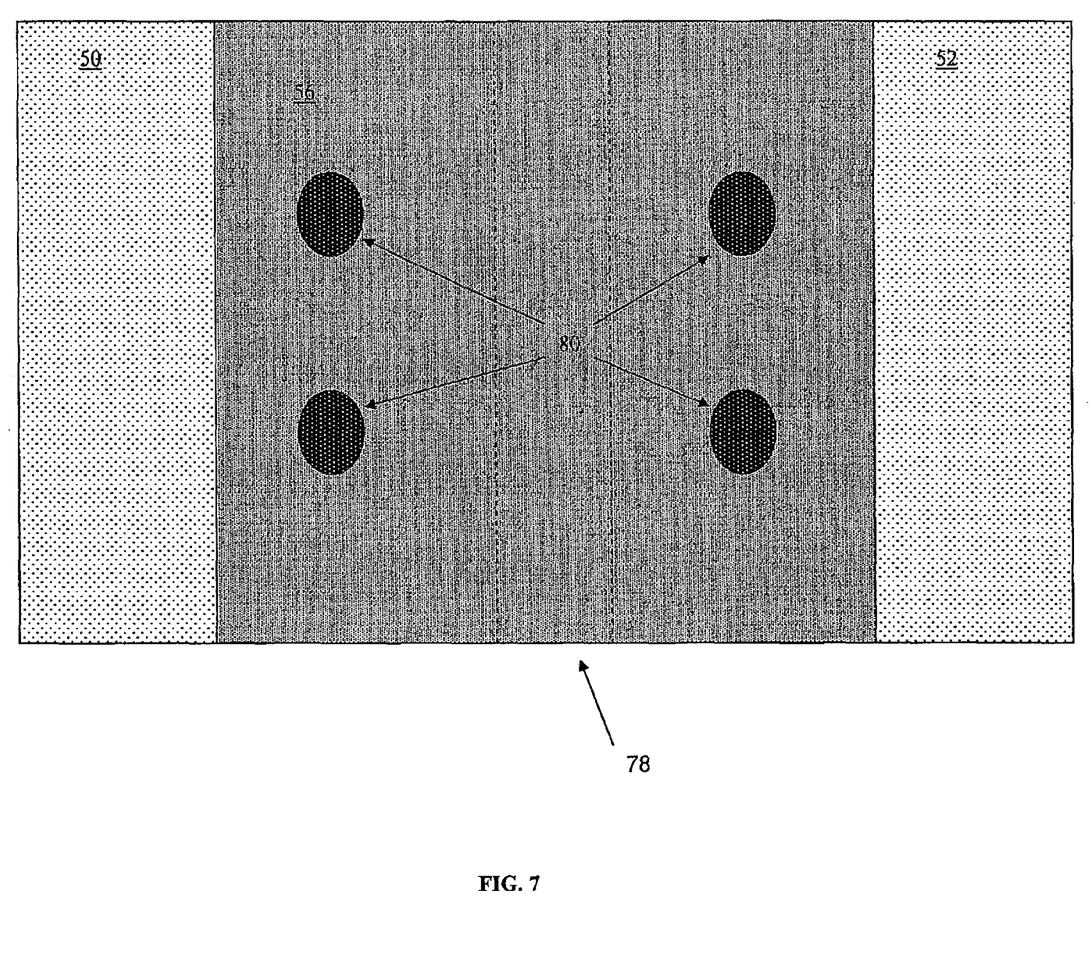
FIG. 7 shows a top view of one embodiment of two seals and a connector in accordance with this invention.
Figure 8:
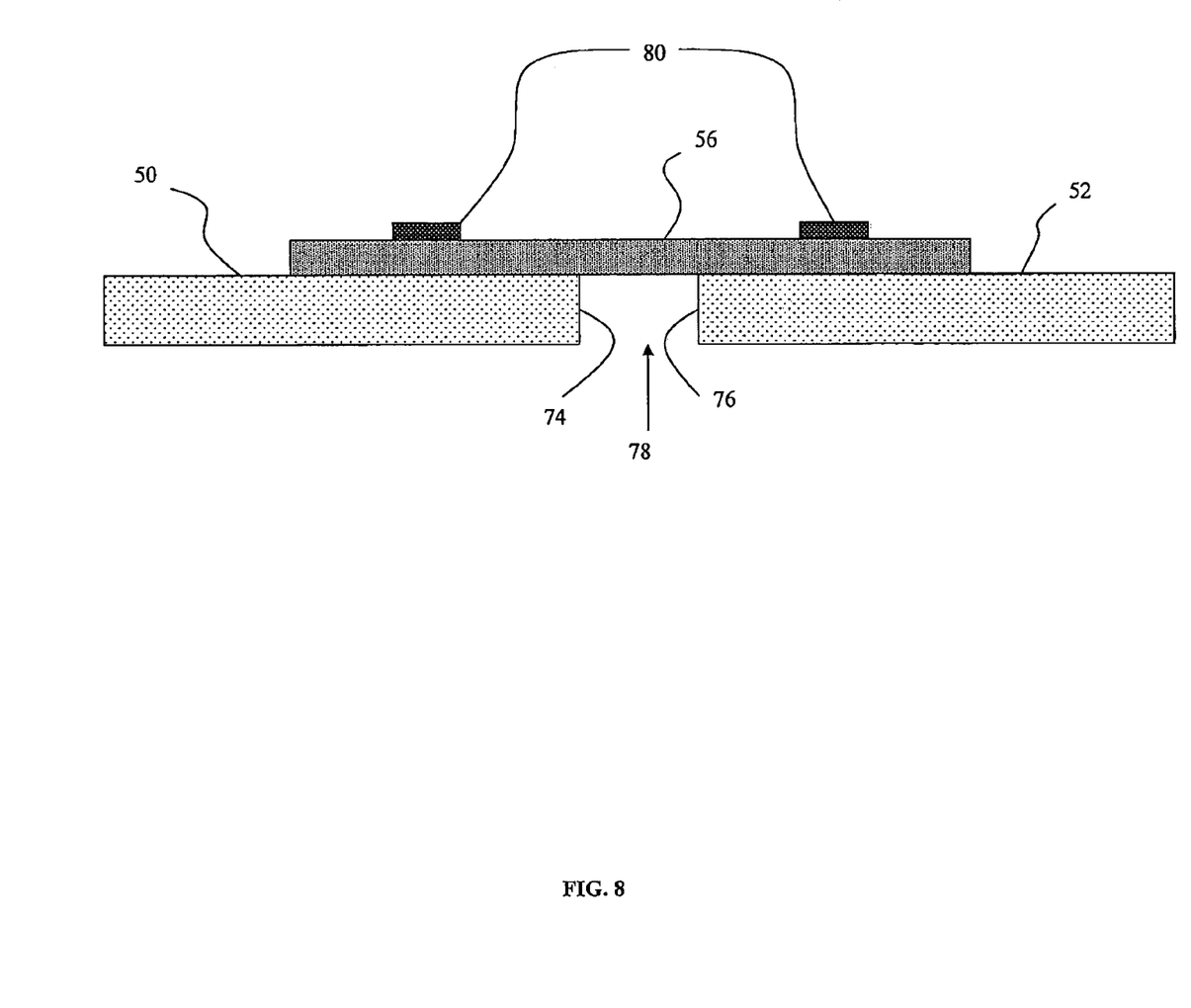
FIG. 8 shows a side view of one embodiment of two seals and a connector in accordance with this invention.
Figure 9:
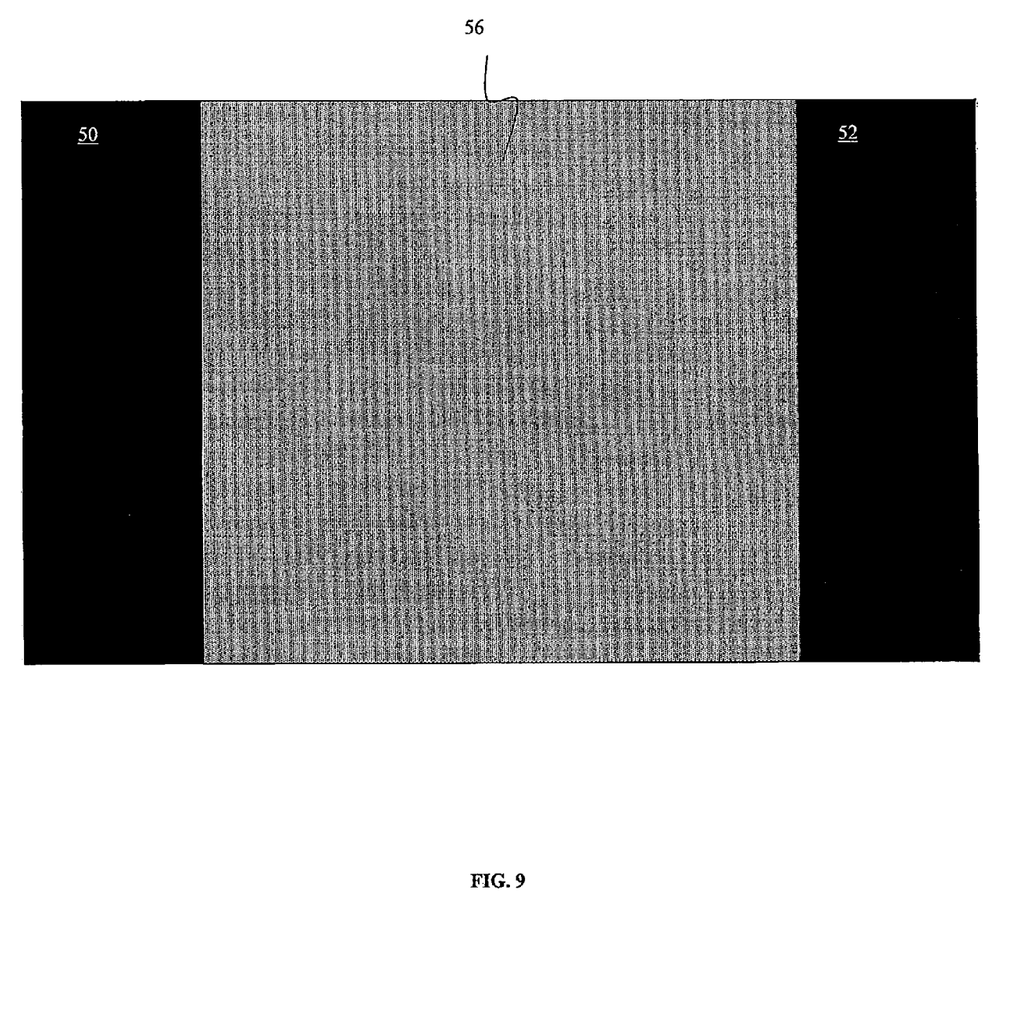
FIG. 9 shows a top view of one embodiment of two seals and a connector in accordance with this invention.

FIG. 7 shows a top view and FIG. 8 shows a side view of first seal 50 and second seal 52 and connector 56 with connector 56 coupled to first seal 50 and second seal 52 with a plurality of attachments 80 in accordance with one embodiment of this invention. First seal 50 has a first seal end 74 (FIG. 8) and second seal 52 has a second seal end 76 (FIG. 8). First seal 50 and second seal 52 may be aligned first seal end 74 to second seal end 76 with a space 78 (FIG. 8) between first seal 50 and second seal 52. Connector 56 covers space 78 between first seal 50 and second seal 52 and first seal end 74 and second seal end 76. In one embodiment of this invention, the connector 56 is substantially the same width as first seal 50 and second seal 52. However, connector 56 may be a different width than first seal 50 and/or second seal 52. Each attachment 80 may include, for example, at least one of a spot weld or a tack. Attachments 80 are illustrated in FIG. 8 partially protruding above connector 56. However, attachments 80 may be flush or inset relative to connector 56. Other attachments may also be used to secure connector 56 to first seal 50 and second seal 52. For example, FIG. 9 shows one embodiment of the invention in a top view of first seal 50 and second seal 52 and connector 56 with connector 56 coupled to the first seal 50 and the second seal 52 with an adhesive. A person skilled in the art will readily recognize many ways for coupling connector 56 to first seal 50 and second seal 52 without visible attachments.

Figure 10:
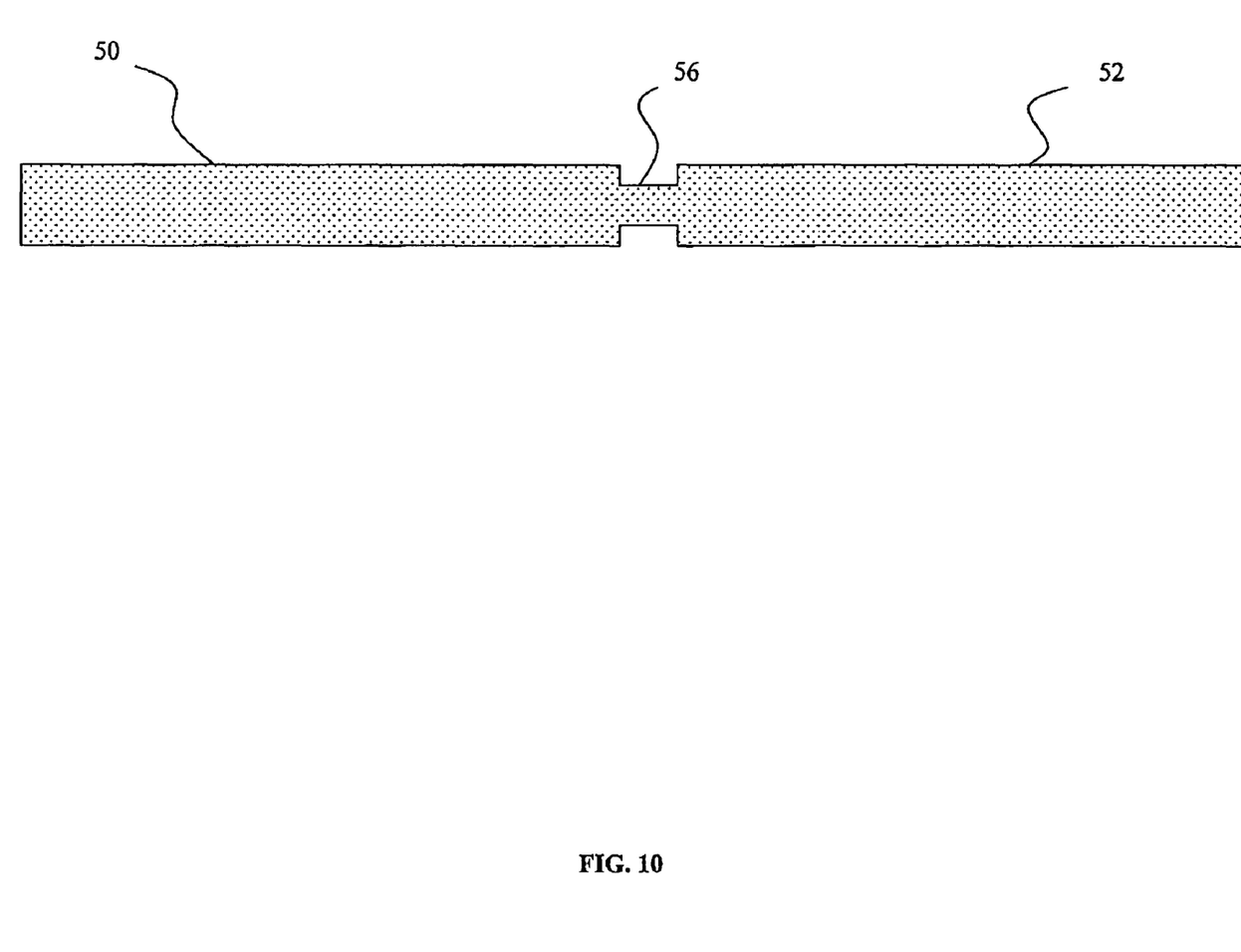
FIG. 10 shows a side view of one embodiment of two seals and a connector in accordance with this invention.

FIG. 10 shows one embodiment of the invention in a side view of first seal 50 and second seal 52 and connector 56 as a unitary continuous material. In this embodiment, connector 56 may be thinner than first seal 50 and second seal 52 thereby making the connector 56 more flexible relative to first seal 50 and second seal 52.

Gas turbine 2 is only illustrative; teachings of the invention may be applied to any machine that disposes two or more seal components leaving a gap.

While various embodiments are described herein, it will be appreciated from the specification that various combinations of elements, variations or improvements therein may be made by those skilled in the art, and are within the scope of the invention. In addition, many modifications may be made to adapt a particular situation or material to the teachings of the invention without departing from essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A gas turbine, comprising:
    a first arcuate component adjacent to a second arcuate component;
    a first slot and a second slot connected to the first slot on an end of the first arcuate component;
    a first seal disposed into the first slot and a first adjacent slot on the second arcuate component;
    a second seal disposed into the second slot and a second adjacent slot on the second arcuate component, leaving a gap between the first seal and the second seal; and
    a connector, wherein the connector is disposed into the first slot and a first adjacent slot and the second slot and the second adjacent slot, is coupled to the first seal and the second seal, and substantially covers the gap between the first seal and the second seal.

2. The gas turbine of claim 1, wherein the connector includes a flexible material.

3. The gas turbine of claim 1, wherein the first seal and the second seal include a semi-rigid material.

4. The gas turbine of claim 1, wherein the connector is coupled to the first seal and the second seal with an adhesive.

5. The gas turbine of claim 1, wherein the first seal and the second seal each include at least one of metal, a cloth-layer, a cloth-layer assemblage, and a foil-layer assemblage.

6. The gas turbine of claim 1, wherein the connector includes at least one of metal, a cloth-layer, a cloth-layer assemblage, and a foil-layer assemblage.

7. The gas turbine of claim 1, wherein the first seal and the second seal and the connector are a unitary continuous material.

8. The gas turbine of claim 1, wherein the connector is substantially the same width as the first seal and the second seal.

9. The gas turbine of claim 1, wherein the first arcuate component and second arcuate component are one of an outer shroud, an inner shroud, a nozzle block or a diaphragm.

10. The gas turbine of claim 1, wherein the connector is coupled to the first seal and the second seal with a plurality of attachments.

11. The gas turbine of claim 10, wherein each attachment includes at least one of a spot weld or a tack.

12. A gas turbine, comprising:
    a turbine including at least one annular arrangement of arcuate components;
    a first arcuate component adjacent to a second arcuate component, wherein the first arcuate component and second arcuate component are one of an outer shroud, an inner shroud, a nozzle block or a diaphragm;
    a first slot and a second slot connected to the first slot on an end of the first arcuate component;
    a first seal disposed into the first slot and a first adjacent slot on the second arcuate component;
    a second seal disposed into the second slot and a second adjacent slot on the second arcuate component, leaving a gap between the first seal and the second seal; and
    a connector, wherein the connector is disposed into the first slot and a first adjacent slot and the second slot and the second adjacent slot, is coupled to the first seal and the second seal, and substantially covers the gap between the first seal and the second seal.

13. The gas turbine of claim 12, wherein the connector includes a flexible material.

14. The gas turbine of claim 12, wherein the first seal and the second seal include a semi-rigid material.

15. The gas turbine of claim 12, wherein the connector is coupled to the first seal and the second seal with an adhesive.

16. The gas turbine of claim 12, wherein the first seal and the second seal each include at least one of metal, a cloth-layer, a cloth-layer assemblage, and a foil-layer assemblage.

17. The gas turbine of claim 12, wherein the connector includes at least one of metal, a cloth-layer, a cloth-layer assemblage, and a foil-layer assemblage.

18. The gas turbine of claim 12, wherein the first seal and the second seal and the connector are a unitary continuous material.

19. The gas turbine of claim 12, wherein the connector is coupled to the first seal and the second seal with a plurality of attachments.

20. The gas turbine of claim 19, wherein each attachment includes at least one of a spot weld or a tack.

* * * * *

UNITED STATES PATENT AND TRADEMARK OFFICE
CERTIFICATE OF CORRECTION

| | | |
|---|---|---|
| PATENT NO. | : 8,075,255 B2 | Page 1 of 1 |
| APPLICATION NO. | : 12/415081 | |
| DATED | : December 13, 2011 | |
| INVENTOR(S) | : Victor John Morgan | |

It is certified that error appears in the above-identified patent and that said Letters Patent is hereby corrected as shown below:

Claim 12, Column 6, line 26, delete "adiacent" and insert -- adjacent --; and

Claim 12, Column 6, line 27, delete "adiacent" and insert -- adjacent --.

Signed and Sealed this
Twentieth Day of March, 2012

David J. Kappos
*Director of the United States Patent and Trademark Office*